(12) United States Patent
Stoyanov et al.

(10) Patent No.: US 11,065,862 B2
(45) Date of Patent: Jul. 20, 2021

(54) METHODS OF MAKING SINTERED ARTICLES

(71) Applicant: Kennametal Inc., Latrobe, PA (US)

(72) Inventors: Pantcho Stoyanov, Pittsburgh, PA (US); Paul Prichard, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/196,846

(22) Filed: Nov. 20, 2018

(65) Prior Publication Data

US 2019/0084290 A1 Mar. 21, 2019

Related U.S. Application Data

(63) Continuation of application No. 14/591,630, filed on Jan. 7, 2015, now Pat. No. 10,144,065.

(51) Int. Cl.
*B33Y 70/00* (2020.01)
*B33Y 10/00* (2015.01)
(Continued)

(52) U.S. Cl.
CPC .............. *B33Y 70/00* (2014.12); *B33Y 10/00* (2014.12); *C22C 29/08* (2013.01); *B22F 3/10* (2013.01);
(Continued)

(58) Field of Classification Search
CPC ................................ B33Y 70/00; B33Y 10/00
(Continued)

(56) References Cited

U.S. PATENT DOCUMENTS

| 2,884,227 A | 4/1959 | Hjalsten |
| 4,059,879 A | 11/1977 | Chmura et al. |

(Continued)

FOREIGN PATENT DOCUMENTS

| CN | 106780724 | 5/2017 |
| EP | 0864661 A1 | 9/1998 |

(Continued)

OTHER PUBLICATIONS

Oct. 7, 2019 Non-Final OA.

(Continued)

*Primary Examiner* — Weiping Zhu
(74) *Attorney, Agent, or Firm* — Larry R. Meenan

(57) ABSTRACT

Methods of making sintered articles from powder metal carbide compositions by additive manufacturing techniques are described herein. Sintered carbide articles fabricated by such additive manufacturing techniques, in some embodiments, exhibit densities equaling articles formed according to conventional techniques employed in powder metallurgy. For example, a method of manufacturing an article comprises providing sintered cemented carbide powder comprising a hard particle phase including tungsten carbide and a metallic binder phase and forming the sintered cemented carbide powder into a green article by one or more additive manufacturing techniques. The green article is sintered to provide a sintered article having density greater than 90% theoretical full density, wherein the green article has a density less than 50% theoretical full density prior to sintering.

7 Claims, 5 Drawing Sheets

(51) Int. Cl.
*C22C 29/08* (2006.01)
*C22C 29/06* (2006.01)
*B22F 10/10* (2021.01)
*B22F 3/10* (2006.01)
*B22F 3/15* (2006.01)

(52) U.S. Cl.
CPC ............... *B22F 3/15* (2013.01); *B22F 10/10* (2021.01); *B22F 2201/12* (2013.01); *B22F 2207/05* (2013.01); *B22F 2999/00* (2013.01); *C22C 29/067* (2013.01)

(58) Field of Classification Search
USPC .......................................................... 419/65
See application file for complete search history.

(56) References Cited

U.S. PATENT DOCUMENTS

| | | | |
|---|---|---|---|
| 4,925,490 A | 5/1990 | Nagai et al. | |
| 6,220,117 B1 | 4/2001 | Butcher | |
| 7,776,256 B2 | 8/2010 | Smith et al. | |
| 8,007,714 B2 | 8/2011 | Mirchandani et al. | |
| 8,459,380 B2 | 6/2013 | Mirchandani et al. | |
| 9,393,674 B2 | 7/2016 | Keshavan | |
| 9,435,211 B2 | 9/2016 | Xu | |
| 2003/0000339 A1 | 1/2003 | Findeisen et al. | |
| 2003/0034177 A1 | 2/2003 | Chitwood et al. | |
| 2004/0134309 A1 | 7/2004 | Liu | |
| 2007/0277651 A1 | 12/2007 | Calnan et al. | |
| 2010/0193254 A1 | 8/2010 | Lind et al. | |
| 2011/0030440 A1 | 2/2011 | Keane et al. | |
| 2012/0040183 A1 | 2/2012 | Kelkar | |
| 2012/0151846 A1 | 6/2012 | Wan | |
| 2012/0292053 A1 | 11/2012 | Xu et al. | |
| 2013/0048271 A1 | 2/2013 | VanLue | |
| 2013/0068539 A1 | 3/2013 | Vempati et al. | |
| 2013/0303356 A1 | 11/2013 | Smith et al. | |
| 2013/0313403 A1 | 11/2013 | Atkins et al. | |
| 2013/0316149 A1 | 11/2013 | Atkins et al. | |
| 2013/0320598 A1 | 12/2013 | Atkins et al. | |
| 2013/0333950 A1 | 12/2013 | Atkins et al. | |
| 2014/0087210 A1* | 3/2014 | Keane ................ B22F 7/02 428/810 | |
| 2015/0129316 A1 | 5/2015 | Harrington et al. | |
| 2015/0283614 A1 | 10/2015 | Wu et al. | |
| 2015/0354284 A1 | 12/2015 | Griffo et al. | |
| 2016/0039006 A1 | 2/2016 | Amstutz et al. | |
| 2016/0053550 A1 | 2/2016 | Wilson et al. | |
| 2016/0067780 A1 | 3/2016 | Zediker | |
| 2016/0076342 A1 | 3/2016 | Silva | |
| 2016/0082667 A1 | 3/2016 | Donderici | |
| 2016/0084083 A1 | 3/2016 | Hice et al. | |
| 2016/0088870 A1 | 3/2016 | Langeland | |
| 2016/0138343 A1 | 5/2016 | Collins et al. | |
| 2016/0138362 A1 | 5/2016 | Dockweiler | |
| 2016/0177637 A1 | 6/2016 | Fleckenstein et al. | |
| 2016/0185009 A1 | 6/2016 | Keshavan et al. | |
| 2016/0201425 A1 | 7/2016 | Walton et al. | |
| 2016/0207109 A1 | 7/2016 | Buller et al. | |
| 2016/0222798 A1 | 8/2016 | Snyder et al. | |
| 2016/0258223 A1 | 9/2016 | Uhlenberg et al. | |
| 2016/0258242 A1 | 9/2016 | Hayter et al. | |
| 2016/0258298 A1 | 9/2016 | Channel et al. | |
| 2016/0288200 A1 | 10/2016 | Xu et al. | |
| 2016/0312567 A1 | 10/2016 | Murphree et al. | |
| 2016/0325348 A1 | 11/2016 | Ownby et al. | |
| 2016/0332236 A1 | 11/2016 | Stoyanov | |
| 2016/0375493 A1 | 12/2016 | Stoyanov et al. | |
| 2017/0037518 A1 | 2/2017 | Oxford et al. | |
| 2017/0050241 A1 | 2/2017 | Thomas et al. | |
| 2017/0072465 A1 | 3/2017 | Welch et al. | |
| 2017/0072469 A1 | 3/2017 | Maderud et al. | |
| 2017/0087622 A1 | 3/2017 | Cook, III et al. | |
| 2017/0100771 A1 | 4/2017 | Voglewede et al. | |
| 2017/0101835 A1 | 4/2017 | Webster et al. | |
| 2017/0101836 A1 | 4/2017 | Webster et al. | |
| 2017/0107764 A1 | 4/2017 | Cook, III et al. | |
| 2017/0173696 A1 | 6/2017 | Sheinman | |
| 2017/0342779 A1 | 11/2017 | Cook, III | |
| 2017/0369382 A1 | 12/2017 | Billotte Cabre et al. | |
| 2018/0236687 A1 | 8/2018 | Prichard et al. | |
| 2018/0250744 A1 | 9/2018 | Symeonidis et al. | |
| 2019/0168299 A1 | 6/2019 | Prichard et al. | |

FOREIGN PATENT DOCUMENTS

| | | |
|---|---|---|
| EP | 2690196 A | 1/2014 |
| EP | 2465960 A1 | 6/2016 |
| EP | 3409801 A1 | 12/2018 |
| JP | H1088311 A | 4/1998 |
| JP | 2002356328 A | 12/2002 |
| WO | WO2011008439 A1 | 1/2011 |
| WO | WO2011149401 A1 | 12/2011 |
| WO | 2015073081 A | 5/2015 |
| WO | 2015162206 A2 | 10/2015 |
| WO | WO2015162206 A2 | 10/2015 |
| WO | WO2016056934 | 4/2016 |
| WO | WO2016076853 | 5/2016 |
| WO | WO2016085452 | 6/2016 |
| WO | WO2016094704 A1 | 6/2016 |
| WO | WO2016112169 | 7/2016 |
| WO | WO2016176221 | 11/2016 |
| WO | WO2017011825 | 1/2017 |
| WO | WO2017039619 | 3/2017 |
| WO | WO2017069744 | 4/2017 |

OTHER PUBLICATIONS

Aug. 13, 2019 Non-Final OA.
Kelley, III, Andrew, Tungsten Carbide-Cobalt by Three Dimensional Printing.
Dec. 17, 2018 Non-Final OA.
Wu et al., "Minimum Compliance Topology Optimization of Shell-Infill Composites for Additive Manufacturing", Computer Methods in Applied Mechanics and Engineering, 2017.
Kruth et al., "Consolidation phenomena in laser and powder-bed based layered manufacturing", CIRP Annals-Manufacturing Technology, 56 (2007), p. 730-759.
Clausen et al., "Exploiting Additive Manufacturing Infill in Topology Optimization for Improved Buckling Load", Engineering, 2 (2016), p. 250-257.
Belter et al., "Strengthening of 3D Printed Fused Deposition Manufactured Parts Using the Fill Compositing Technique", PLOS One, 2015.
Hashe N G et al, "Characterization of WC-(W,V)C-Co made from pre-alloyed (W,V)C", International Journal of Refractory Metals and Hard Materials, Elsevier, Amsterdam, NL, vol. 27, No. 2, doi:10.1016/J.IJRMHM.2008.09.020, ISSN 0263-4368, (Mar. 1, 2009), pp. 229-233, (Nov. 7, 2008), XP025937878 14,17-20; p. 229, col. L, line 5; paragraph 1, table 3.
Kernan et al, "Three-dimensional printing of tungsten carbide-10wt% cobalt using a cobalt oxide precursor", International Journal of Refractory Metals and Hard Materials, Elsevier, Amsterdam, NL, (Jan. 1, 2007), vol. 25, No. 1, doi:10.1016/J.IJRMHM.2006.02.002, ISSN 0263-4368, pp. 82-94, XP005719849 [A] 1-14,17-20, paragraphs [0001], [0003], [0004].
Wang et al., Direct Selective Laser Sintering of Hard Metal Powders.
Laoui, T. et al., Influence of powder parameters on selective laser sintering of tungsten carbide.
Davis, E.A., An Introduction to Metal Matrix Composites.
May 6, 2019 Final OA.
May 31, 2018 International Search Report Transmitted.
Feb. 27, 2020 Advisory Action.
Feb. 21, 2020 Non-Final OA.
Jan. 30, 2020 Final OA.
Jan. 16, 2020 Foreign OA.
Dec. 24, 2019 Exam Notice.
Dec. 20, 2019 Final OA.

(56) References Cited

OTHER PUBLICATIONS

Aug. 22, 2019 Advisory Action.
Yun Bai et al., Effect of Particle Size Distribution on Powder Packing and Sintering in Binder Jetting Additive Manufacturing of Metals. Journal of Manufacturing Science and Engineering, Jan. 6, 2017, vol. 139.
Jan. 4, 2020 Search Report.
May 13, 2020 Office Action.
Fundamentals of Medical Implant Materials.
Fabricating Functional Ti-Alloy.
Aug. 5, 2020—Final Rejection—P17-06293-US-NP.pdf.
Jun. 15, 2020 NonFinal OA P16-06191-US-NP.pdf.
Comparison of Bone Ingrowth.
Das et al., Producing Metal Parts with Selective Laser Sintering/Hot Isostatic Pressing, JOM, 50 (12) (1998), pp. 17-20.

* cited by examiner

METHODS OF MAKING SINTERED ARTICLES

RELATED APPLICATION DATA

Pursuant to 35 U.S.C. § 120, the present application is a continuation application of U.S. patent application Ser. No. 14/591,630, filed Jan. 7, 2015.

FIELD

The present invention relates to sintered articles and, in particular, to methods of making sintered articles from powder metal carbide compositions by additive manufacturing techniques.

BACKGROUND

Additive manufacturing generally encompasses processes in which digital 3-dimensional (3D) design data is employed to fabricate an article or component in layers by material deposition and processing. Several techniques have been developed falling under the umbrella of additive manufacturing. Laser sintering, for example, is a common additive manufacturing technique wherein a thin layer of powder material is applied to a building substrate or platform. A laser beam subsequently fuses the powder at points predetermined by the digital data encoding the shape and dimensions of the article to be fabricated. The platform is then lowered and another layer of powder is applied and selectively fused to bond with the layer below at the predetermined points. This process is repeated until fabrication of the article is complete.

In view of this example, additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of lubricants and coolant. Most importantly, additive manufacturing enables significant freedom in article design. Articles having highly complex shapes can be produced without significant expense allowing the development and evaluation of a series of article designs prior to final design selection.

SUMMARY

Methods of making sintered articles from powder metal carbide compositions by additive manufacturing techniques are described herein. Sintered carbide articles fabricated by such additive manufacturing techniques, in some embodiments, exhibit densities and hardness equaling articles formed according to conventional powder metallurgical techniques. For example, a method of manufacturing an article comprises providing sintered cemented carbide powder comprising a hard particle phase including tungsten carbide and a metallic binder phase and forming the sintered cemented carbide powder into a green article by one or more additive manufacturing techniques. The green article is sintered to provide a sintered article having density greater than 90% theoretical full density, wherein the green article has a density less than 50% theoretical full density prior to sintering. In some embodiments, the density of the sintered article is greater than 95% theoretical full density.

In another embodiment, a method of manufacturing an article comprises providing a sintered cermet powder having a hard particle phase including at least one of a carbide, nitride and carbonitride of a Group IVB metal and a metallic binder phase. The sintered cermet powder is formed into a green article by one or more additive manufacturing techniques. The green article is sintered to provide a sintered article having density greater than 90% theoretical full density, wherein the green article has a density less than 50% theoretical full density prior to sintering. In some embodiments, the density of the sintered article is greater than 95% theoretical full density.

These and other embodiments are further described in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Methods of making sintered articles from powder metal carbide compositions by additive manufacturing techniques are described herein. A method of manufacturing an article comprises providing sintered cemented carbide powder comprising a hard particle phase including tungsten carbide and a metallic binder phase and forming the sintered cemented carbide powder into a green article by one or more additive manufacturing techniques. The green article is sintered to provide a sintered article having density greater than 90% theoretical full density, wherein the green article has a density less than 50% theoretical full density prior to sintering.

Figure 3:
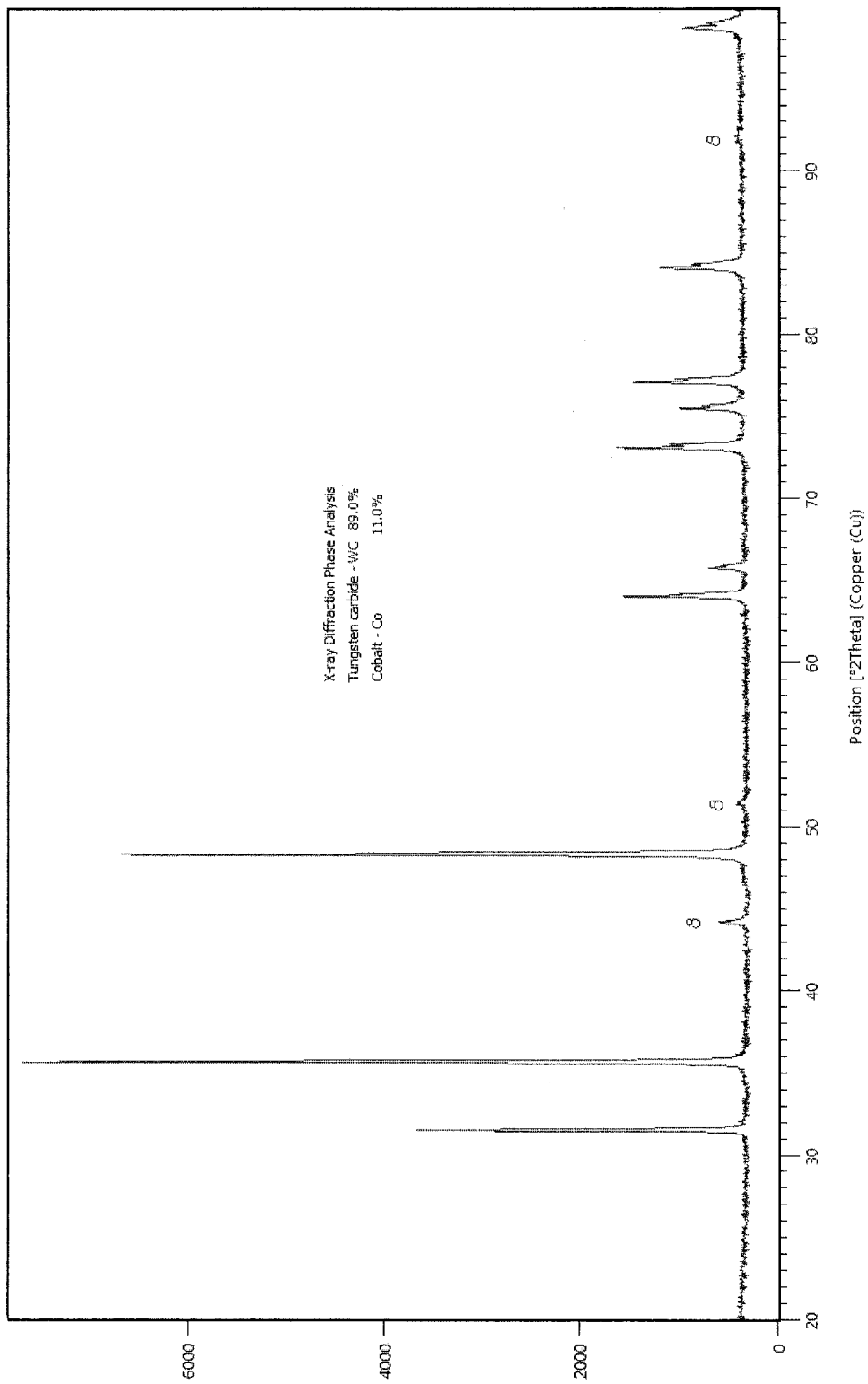
FIG. 3 is an X-ray diffractogram of sintered cemented carbide powder according to one embodiment described herein.

Turning now to specific components, methods described herein employ sintered cemented carbide powder comprising a hard particle phase including tungsten carbide and a metallic binder phase. Tungsten carbide of the hard particle phase can consist of stoichiometric WC. FIG. 3, for example, is an X-ray diffractogram of a sintered cemented carbide powder wherein WC is the sole phase present. Alternatively, tungsten carbide of the hard particle phase can comprise a WC phase and $W_2C$ phase. Further, the hard particle phase can be formed solely of tungsten carbide. In other embodiments, the hard particle phase can further comprise carbide, nitride and/or carbonitride of one or more metals selected from Groups IVB-VIB of the Periodic Table. For example, in addition to tungsten carbide, the hard particle phase can include at least one of tantalum carbide, niobium carbide, vanadium carbide, chromium carbide, zirconium carbide, hafnium carbide, titanium carbide and solid solutions thereof.

As described herein, the sintered cemented carbide powder also includes a metallic binder phase. In some embodiments, the metallic binder phase is formed of cobalt, nickel or iron or alloys thereof. The metallic binder phase can be present in the sintered cemented carbide powder in any amount not inconsistent with the objectives of the present invention. Generally, the metallic binder phase is present in an amount of 3 wt. % to 30 wt. % of the sintered cemented carbide powder. In some embodiments, the metallic binder phase is present in an amount selected from Table I.

TABLE I

| Metallic Binder Phase Wt. % of Sintered Cemented Carbide Powder |
| --- |
| 5-25 |
| 10-20 |
| 10-30 |
| 15-25 |

Figure 1B:
FIG. 1(b) is a cross-sectional SEM image of sintered cemented carbide particles of FIG. 1(a).
Figure 1A:
FIG. 1(a) is a scanning electron microscopy (SEM) image of sintered cemented carbide powder according to one embodiment described herein.
Figure 2:
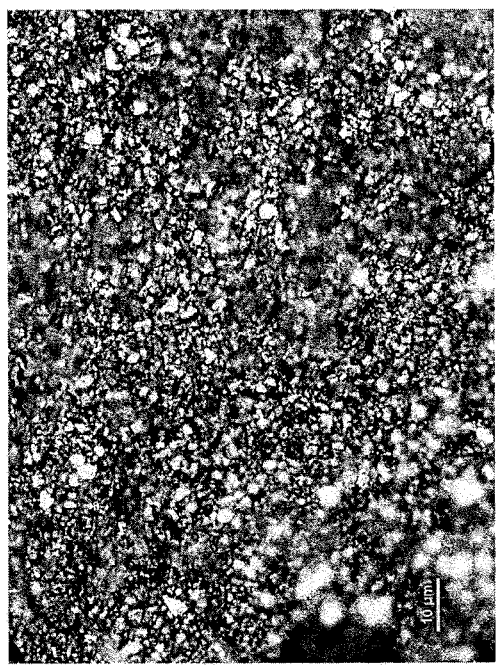
FIG. 2 is a cross-sectional SEM image of sintered cemented carbide powder according to one embodiment described herein.

In being sintered, an individual particle of the cemented carbide powder is formed of smaller particles bound together by the metallic binder phase. FIG. 1 illustrates this microstructure in a sintered WC-17% Co powder. As provided in FIG. 1(a), WC particles are bound by Co binder to form individual sintered cemented carbide particles. FIG. 1(b) provides a cross-sectional image of the sintered cemented carbide particles where Co binder phase is differentiated from the WC particle phase. FIG. 2 also provides a cross-sectional SEM image of a sintered WC-20% Co powder where metallic binder phase is differentiated from hard particle phase. Hard particles, including tungsten carbide particles, can be intensively milled with powder metallic binder and subsequently spray dried. The resulting hard particles and associated binder are sintered to provide the sintered cemented carbide powder.

The sintered cemented carbide powder can have any desired average particle size. For example, the sintered cemented carbide powder generally has an average particle size of 0.1 μm to 100 μm. Average particle size of the sintered cemented carbide powder can be selected according to several considerations including desired density and hardness of the sintered article formed from the powder, packing characteristics of the powder and compatibility of powder flow characteristics with the additive manufacturing technique employed in green forming. In some embodiments, the sintered cemented carbide powder has an average particle size selected from Table II.

TABLE II

| Average Particle Size of Sintered Cemented Carbide Powder (μm) |
| --- |
| 1-50 |
| 5-45 |
| 10-30 |
| 20-50 |

One or more surface treatments can be applied to the sintered cemented carbide powder. Surface treatments can be applied to alter and/or enhance packing and flow characteristics of the sintered cemented carbide powder. Suitable surface treatments, in some embodiments, comprise waxes, polymeric species and/or other organic dispersant species.

Moreover, powder metal carbide, metal nitride and/or metal carbonitride can be added to the sintered cemented carbide powder. Additional powder metal carbide, nitride and/or carbonitride can be added in any desired amount. In some embodiments, for example, additional powder metal carbide, nitride and/or carbonitride can be added in an amount of 0.1 to 5 wt. % of the sintered cemented carbide powder. The additional powder metal carbide, nitride and/or carbonitride can exhibit an average particle size commensurate with average particle size of the sintered cemented carbide powder. Alternatively, the additional powder metal carbide, nitride and/or carbonitride can have an average particle size less than the sintered cemented carbide powder. In such embodiments, the additional powder may fill gaps or interstitial spaces between sintered cemented carbide particles. Metal of the additional powder carbide, nitride and/or carbonitride can be one or more transition metals, including transition metals selected from Groups IIIB-VIIIB of the Periodic Table.

As described herein, the sintered cemented carbide powder is formed into a green article by one or more additive manufacturing techniques. Any additive manufacturing technique operable to form the sintered cemented carbide powder into a green article having properties described herein can be employed. In some embodiments, additive manufacturing techniques employing a powder bed are used to construct green articles formed of sintered cemented carbide powder. For example, binder jetting can provide a green article formed of sintered cemented carbide powder. In the binder jetting process, an electronic file detailing the design parameters of the green part is provided. The binder jetting apparatus spreads a layer of the sintered cemented carbide powder in a build box. A printhead moves over the powder layer depositing liquid binder according to design parameters for that layer. The layer is dried, and the build box is lowered. A new layer of sintered cemented carbide powder is spread, and the process is repeated until the green article is completed. In some embodiments, other 3D printing apparatus can be used to construct the green part from the sintered cemented carbide powder in conjunction with organic binder.

The green article formed of the sintered cemented carbide powder is sintered to provide a sintered article having density greater than 90% theoretical full density. In some embodiments, density of the sintered article is greater than 95% or 97% theoretical full density. As described herein, the green article exhibits density of less than 50% theoretical full density prior to sintering. In some embodiments, the green article has a density selected from Table III.

TABLE III

| Green Article Density<br>% Theoretical Full Density |
| --- |
| ≤45 |
| ≤40 |
| ≤30 |
| 10-40 |
| 20-30 |

The high density of the sintered article formed from the low density green article is unexpected. General knowledge in the art requires green parts formed of cemented carbide powder to have at least 50% theoretical full density for proper sintering and attainment of acceptable sintered density. Conventional powder metallurgical techniques employ pressing operations to sufficiently densify cemented carbide powder compositions prior to sintering. As detailed in the examples herein, low density green parts formed of sintered cemented carbide powder can be provided by additive manufacturing techniques and sintered to high density without pressing or other densification operations.

Green articles described herein can be sintered under conditions and for time periods to provide sintered articles having the desired density. The green part can be vacuum sintered or sintered under a hydrogen or argon atmosphere at temperatures of 500° C. to 2000° C. In some embodiments, the sintering temperature is 1300° C. to 1560° C. Moreover, sintering times can range from 10 minutes to 10 hours. In some embodiments, hot isostatic pressing (HIP) is added to the sintering process. Hot isostatic pressing can be administered as a post-sinter operation or during vacuum sintering. Hot isostatic pressing can be administered for up to 10 hours at pressures of 1 MPa to 300 MPa and temperatures of 800° C. to 2000° C. Sintered articles described herein that are subjected to HIP can exhibit densities greater than 98% theoretical full density. In some embodiments, density of a sintered-HIP article is at least 99% theoretical full density.

Sintered articles described herein can have hardness of 500 to 3000 HV500gf. HV500gf refers to Vickers Hardness using a 500 gram-force load. The microhardness equipment is certified according to ASTM E 384—Standard Methods for Knoop and Vickers Hardness Materials. In some embodiments, for example, a sintered article has hardness of 700-1500 HV30. Additionally, sintered articles described herein can be free or substantially free of lower carbide phases, including eta phase [(CoW)C], $W_2C$ and $W_3C$. Alternatively, the sintered articles can include lower carbide phases in minor amounts (generally <5 wt. %). Moreover, a sintered article described herein can have an average grain size less than 100 μm. In some embodiments, for example, a sintered article has an average grain size of 1-50 μm or 10-40 μm.

In another embodiment, a method of manufacturing an article comprises providing a sintered cermet powder having a hard particle phase including at least one of a carbide, nitride and carbonitride of a Group IVB metal and a metallic binder phase. The sintered cermet powder is formed into a green article by one or more additive manufacturing techniques. The green article is sintered to provide a sintered article having density greater than 90% theoretical full density, wherein the green article has a density less than 50% theoretical full density prior to sintering. In some embodiments, density of the sintered article is greater than 95% or 97% theoretical full density.

Hard particle phase of the sintered cermet powder, in some embodiments, comprises at least one to TiC, TiN and TiCN. Further, the metallic binder phase can be selected from the group consisting of nickel, cobalt, molybdenum and alloys thereof. The sintered cermet powder can be similar in structure to sintered cemented carbide powders described herein. For example, an individual particle of the cermet powder is formed of smaller hard particles bound together by the metallic binder phase. The sintered cermet powder can have an average particle size of 0.1 μm to 100 μm.

Sintered cermet articles can have properties, including density, hardness and average grain size, commensurate with the sintered cemented carbide articles described herein. Moreover, green articles formed of sintered cermet powder can have densities selected from Table III above. Such green articles can be sintered and processed under conditions described above.

Sintered articles produced according to methods described herein can be employed in a variety of industries including petrochemical, automotive, aerospace, industrial tooling and manufacturing. In some embodiments, the sintered articles are used as components exposed to wear environments or abrasive operating conditions such as bearings, valves and/or fluid handling components.

These and other embodiments are further illustrated by the following non-limiting examples.

Example 1—Sintered Article

Figure 4:
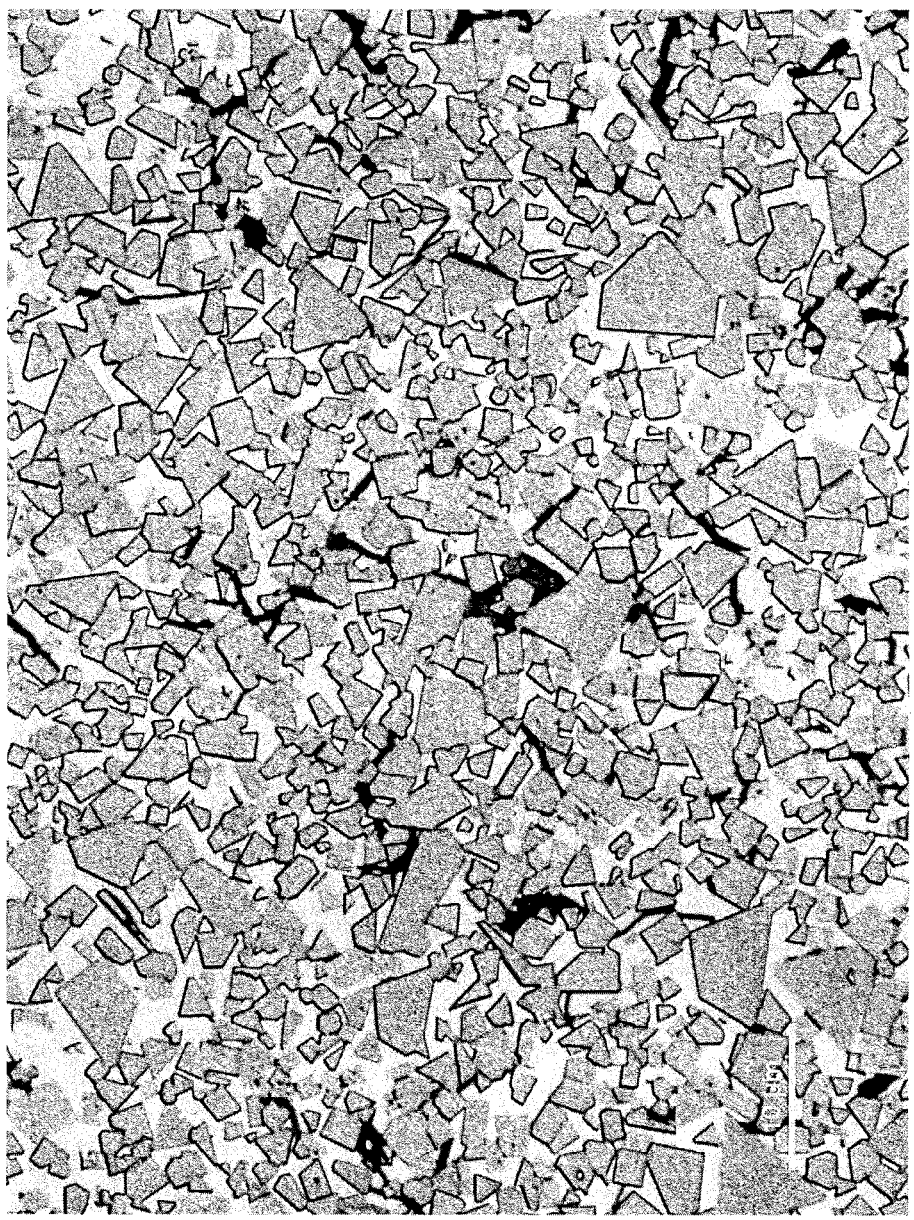
FIG. 4 is a cross-sectional metallographic image (i.e. of the xy-plane) of a sintered and hot isostatic pressed article fabricated according to a method described herein.

Sintered cemented carbide powder (WC-17% Co) was loaded into the chamber of a 3D printing system from ExOne of N. Huntingdon, Pa. The 3D printing system generated the green article in a layered process using iterative spreading of the WC-17% Co powder in a build box followed by application of binder according to the design of the three-dimensional article. The WC-17% Co powder possessed a microstructure as illustrated in FIGS. 1(a)-(b) and was free of any lower carbide phases as evidenced by the diffractogram of FIG. 3. The completed green article exhibited density of about 27.3% theoretical full density. The green article was removed from the 3D printing chamber and vacuum sintered at a temperature of about 1480° C. for 45 minutes followed by fast cooling. The resulting sintered article exhibited density of 97.7±0.4% theoretical full density. HIP was subsequently administered to the sintered article for 70 minutes at a temperature of about 1425° C. and pressure of 20,000±500 psi. Density of the sintered article increased to 98.7±0.2% theoretical full density after HIP. FIG. 4 is a cross-sectional metallographic image of the sintered article. Further, hardness of the sintered article was determined to be 1100 HV500gf. Such hardness was commensurate with a sintered article of WC-17% Co formed according to conventional powder metallurgical techniques as provided in Table IV.

TABLE IV

| Hardness Comparison (HV500gf) ||
| --- | --- |
| WC-17% Co Example 1 | WC-17% Co Powder Metallurgy |
| 1100 | 1050 |

Example 2—Sintered Article

A sintered article was produced according to the procedure set forth in Example 1, the difference being the use of sintered cemented carbide powder of WC-20% Co. A cross-sectional SEM image of the sintered WC-20% Co powder is provided in FIG. 2. Similar to Example 1, density of the green article was also less than 30% theoretical full density and the final density of the sintered article following HIP was 96.3% theoretical full density.

Example 3—Sintered Cemented Carbide Powder

Figure 5B:
FIG. 5(b) is a cross-sectional SEM image of sintered cemented carbide particles of FIG. 5(a).
Figure 5A:
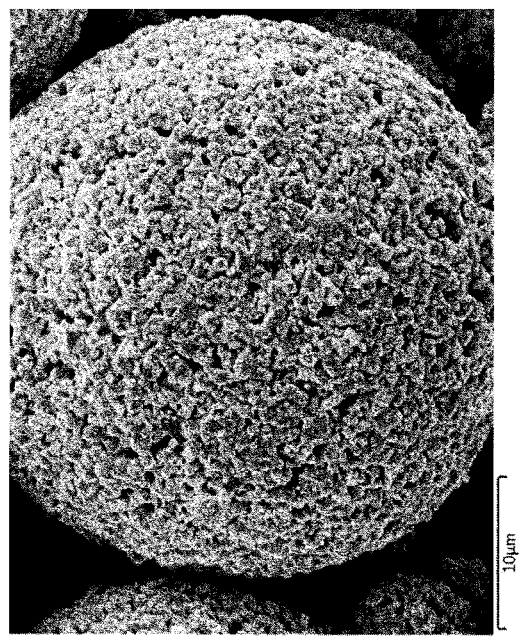
FIG. 5(a) is an SEM image of sintered cemented carbide powder according to one embodiment described herein.

WC-12% Co powder was produced by spray drying and sintering. This sintered cemented carbide powder can be used to fabricate sintered articles according to methods described herein. SEM images of the WC-12% Co powder are provided in FIGS. 5(a)-(b).

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A powder for an additive manufacturing technique comprising:
   sintered cemented carbide particles comprising hard particles bound together by a metallic binder phase; and
   additional particles comprising metal carbide, metal nitride and/or metal carbonitride having an average particle size less than average particle size of the sintered cemented carbide particles, wherein the additional particles fill interstitial spaces between the sintered cemented carbide particles such that a sintered article formed of the powder is greater than 90% theoretical full density.

2. The powder of claim 1, wherein the additional particles are present in an amount of 0.1 to 5 wt. % of the sintered cemented carbide particles.

3. The powder of claim 1, wherein the metal of the additional particles is a transition metal.

4. The powder of claim 1, wherein the hard particles comprise carbide, nitride, and/or carbonitride of one or more metals selected from the Groups IVB-VIB of the Periodic Table.

5. The powder of claim 4, wherein the hard particles comprise tungsten carbide.

6. The powder of claim 4, wherein the hard particles comprise at least one of tantalum carbide, niobium carbide, vanadium carbide, chromium carbide, zirconium carbide, hafnium carbide, titanium carbide and solid solutions thereof.

7. A powder for an additive manufacturing technique comprising:
   sintered cemented carbide particles comprising hard particles bound together by a metallic binder phase; and
   additional particles of metal carbide, metal nitride and/or metal carbonitride having an average particle size less than average particle size of the sintered cemented carbide particles, wherein the additional particles fill interstitial spaces between the sintered cemented carbide particles such that a sintered article formed solely of the powder is greater than 90% theoretical full density.

* * * * *